(12) United States Patent
Yu

(10) Patent No.: US 6,498,581 B1
(45) Date of Patent: Dec. 24, 2002

(54) RADAR SYSTEM AND METHOD INCLUDING SUPERRESOLUTION RAID COUNTING

(75) Inventor: Kai-Bor Yu, Niskayuna, NY (US)

(73) Assignee: Lockheed Martin Corporation (*) Notice: Subject to any disclaimer, the term of this patent is extended or adjusted under 35 U.S.C. 154(b) by 0 days.

(21) Appl. No.: 09/946,187

(22) Filed: Sep. 5, 2001

(51) Int. Cl.[7] ............................................. G01S 13/00
(52) U.S. Cl. ...................... 342/90; 342/77; 342/80; 342/147; 342/195
(58) Field of Search .......................... 342/90, 77, 80, 342/147, 195

(56) References Cited

U.S. PATENT DOCUMENTS

| | | | |
|---|---|---|---|
| 4,835,689 A | 5/1989 | O'Donnell | 364/413.25 |
| 4,982,150 A | 1/1991 | Silverstein | 324/77 |
| 4,989,143 A | 1/1991 | O'Donnell et al. | 364/413.25 |
| 5,068,597 A | 11/1991 | Silverstein et al. | 324/77 |
| 5,117,238 A | 5/1992 | Silverstein | 342/373 |
| 5,262,785 A | 11/1993 | Silverstein | 342/162 |
| 5,262,789 A | 11/1993 | Silverstein | 342/368 |
| 5,294,933 A | 3/1994 | Lee et al. | 342/159 |
| 5,371,506 A | 12/1994 | Yu et al. | 342/380 |
| 5,487,306 A | 1/1996 | Fortes | 73/597 |
| 5,515,060 A | 5/1996 | Hussain et al. | 342/376 |
| 5,531,117 A | 7/1996 | Fortes | 73/602 |
| 5,600,326 A | 2/1997 | Yu et al. | 342/17 |
| 5,630,154 A | 5/1997 | Bolstad et al. | 395/800 |
| 5,892,700 A | 4/1999 | Haardt | 364/807 |
| 6,084,540 A | 7/2000 | Yu | 342/17 |
| 6,087,974 A | 7/2000 | Yu | 342/62 |
| 6,157,677 A | 12/2000 | Martens et al. | 375/240.16 |
| 6,404,379 B1 * | 6/2002 | Yu et al. | 342/80 |

OTHER PUBLICATIONS

Wax and Kailath, "Detection of Signal by Information Theoretic Criteria", IEEE Transactions on Acoustics, Speech and Signals Processing, vol. ASSP–33, No. 2, pp. 387–392, 1985.

Akaike, "A New Look at the Statistical Model Identification", IEEE Transaction on Automatic Control vol. AC–19, No. 6, pp. 716–723, 1974.

Steyskal and Rose, "Digital Beamforming for Radar Systems", Microwave Journal, pp. 121–136 1989.

Steyskal, "Digital Beamforming Antennas", Microwave Journal, pp. 107–124, 1997.

Davis et al. "Nulling Over Extremely Wide Bandwidth When Using Stretch Processing", The MITRE Corp., p. 1–6, date unknown.

Brookner and Howell "Adaptive—Adaptive Array Processing", Proceedings of the IEEE, vol. 74, No. 4, Apr. 1986, pp. 602–604.

(List continued on next page.)

Primary Examiner—Stephen C. Buczinski
(74) Attorney, Agent, or Firm—Duane Morris LLP

(57) ABSTRACT

A system identifies a number of targets within a main beam of an antenna array that transmits the main beam and receives echo returns from the main beam. A covariance matrix is generated using the echo returns. The presence of at least one target within a single range cell is detected. A plurality of consecutive pulses are transmitted in a direction of the single range cell within a sufficiently short period that the at least one target remains within the single range cell while the plurality of consecutive pulses are transmitted. An echo signal is sampled from each of the plurality of pulses. An updated covariance matrix is estimated each time the echo signal is sampled. An eigenvalue decomposition is updated each time the covariance matrix is updated. The number of targets in the single range cell is estimated, based on the updated eigenvalue decomposition.

20 Claims, 3 Drawing Sheets

OTHER PUBLICATIONS

Baltersee, Jens, "Smart Antennas and Space–Time Processing", visited Aug. 14, 1921, http://www.ert.rwth–aachen.de/Personen/baltersee/smart/smart.html.

Plonski, Matthew, "CSD Jul. 2000 Feature: Smart Antenna Schemes for E–911", pp. 1–7, http://www.csdmag.com/main/2000/07/0007feat4.htm visited Aug. 13, 2001.

Ebihara et al., Music Algorithm for a Directional Borehold Radar Using a Conformal Array Antenna, date unknown.

Cheney, Margaret "The Linear Sampling Method and the MUSIC Algorithm", Apr. 2, 2001, pp. 1–6, CODEN:LUTEDX/(TEAT–7089)/1–6/(2000).

Liu et al., An ESPRIT Algorithm for Tracking Time–Varying Signals, TR 92–54, Apr. 24, 1992, pp. 1–22.

Haykin, Simon, "Modern Filters", Macmillan Publishing Co., New York, NY, 1989, pp. 2, 324, 330–333, 337–343.

Schmidt, R.O. Multiple Emitter Location and Signal Parameter Estimation, IEEE, vol. AP–34, No. 3, Mar. 1986.

* cited by examiner

RADAR SYSTEM AND METHOD INCLUDING SUPERRESOLUTION RAID COUNTING

FIELD OF THE INVENTION

The present invention relates to radar systems and methods generally, and more specifically to digital beamforming techniques.

BACKGROUND OF THE INVENTION

Conventional surveillance radar systems cannot resolve more than one target within a range-angle resolution cell while performing surveillance. Such resolution cells arise in radar from the use of finite signal bandwidth and antenna apertures.

In the case of an aircraft attack, it is possible for two or more vehicles to fly in close formation, so that a surveillance radar cannot resolve the number of targets until the aircraft are close to the radar, potentially losing valuable time in which defensive action might have been taken.

Similarly, in missile defense systems, it is possible for many targets within a single range-angle resolution cell to approach a surveillance radar without the radar being able to resolve the number of targets. In the missile defense scenario, the problem is compounded by the possibility that closely spaced re-entry vehicles, decoys, and/or debris may be present.

The failure to identify multiple threats within a single range cell can cause under-commitment of engagement measures.

SUMMARY OF THE INVENTION

The present invention is a method and system for identifying a number of targets within a main beam of an antenna array that transmits the main beam and receives echo returns from the main beam. A covariance matrix is generated using the echo returns. The presence of at least one target within a single range cell is detected. A plurality of consecutive pulses are transmitted in a direction of the single range cell within a sufficiently short period that the at least one target remains within the single range cell while the plurality of consecutive pulses are transmitted. An echo signal is sampled from each of the plurality of pulses. An updated covariance matrix is estimated each time the echo signal is sampled. An eigenvalue decomposition is updated each time the covariance matrix is updated. The number of targets in the single range cell is estimated, based on the eigenvalue decomposition.

DETAILED DESCRIPTION

I. In advanced air and missile defense application, it is desired to determine the number of objects within the target cluster so that appropriate target discrimination analysis can be applied.

Monopulse radar processing is a radar processing technique in which the angular location of a target (also referred to as direction of arrival) can be determined within fractions of a beamwidth by comparing measurements received from two or more simultaneous beams. This technique for estimating the direction of arrival (DOA) of a target is often implemented in surveillance and tracking radar systems comprising a phased array antenna and a digital beamforming (DBF) processor. Typically, one beam is formed for transmission and two beams are formed upon reception for angle measurement. The term monopulse refers to the fact that the echo from a single transmitted pulse returning from a target is used to measure the angle of the target.

Monopulse processing may be implemented for a linear array of N antenna elements which provides respective signals $x(0), \ldots, x(N-1)$ to a beamforming network. The output signals of the beamforming network are the sum, $\Sigma$, and difference, $\Delta$, signals which are processed to generate an output signal, $\theta$, representing the estimated direction of arrival. The sum beam pattern has a symmetrical amplitude profile with respect to its maximum at the boresight, and the difference beam pattern has an antisymmetrical amplitude profile with respect to a zero response at the boresight. In the beamforming network, each of the N input signals is split into two paths, linearly weighted, and then added together. The DOA of a target signal is determined by evaluating (e.g., from a look up table or from a graph) the ratio of the difference signal over the sum signal.

Monopulse processing may also be implemented for planar arrays in which the target azimuth and elevation angles are of interest. In this case the sum and difference signals represent sum and difference signals for angles in elevation and azimuth. These angles are represented by the following symbols: $\Delta_E$ represents the difference signal in elevation, $\Delta_A$ represents the difference signal in azimuth, $\Sigma$ represents the sum signal in elevation as well as in azimuth.

Although the known monopulse processing technique can identify the DOA when used in a surveillance mode, it cannot determine a number of targets within a single range-angle cell based on the echo signal sampled from a single pulse.

Figure 1:
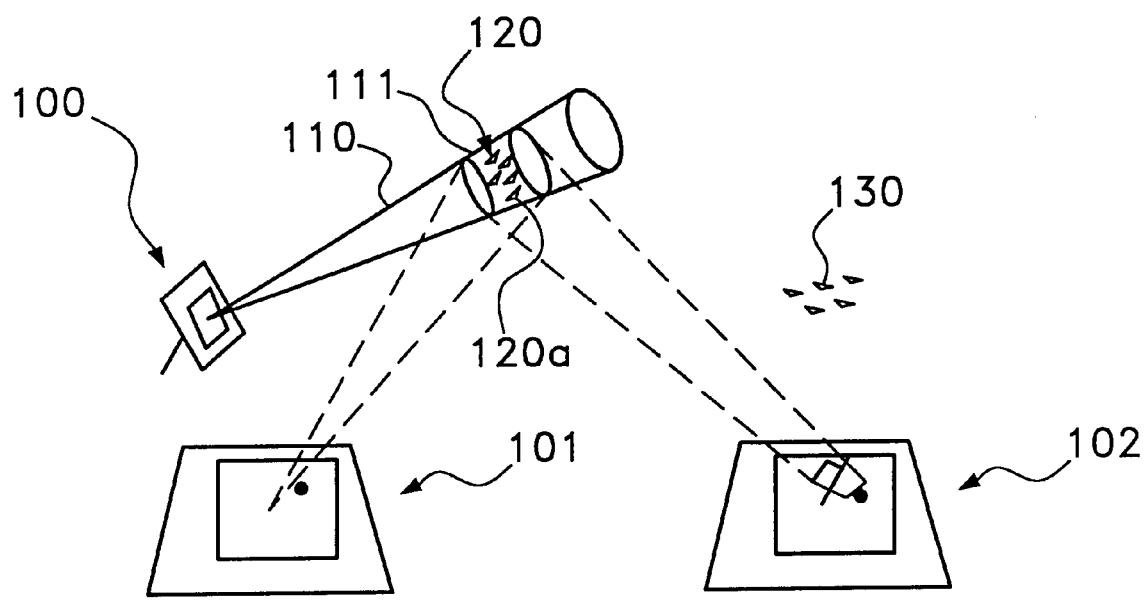
FIG. 1 is a diagram showing an exemplary scenario in which a plurality of targets appear within a single range cell.

FIG. 1 is a diagram showing a plurality of surveillance radars 100, 101, 102 that are scanning the sky during an air raid. In FIG. 1, two groups 120 and 130 of aircraft are approaching the site of radar 100. The aircraft 120a in group 120 are flying in close formation, so that all of the aircraft 120a in group 120 fit within a single range cell 111 of beam 110. The range cell 111 may be, for example, 50 nautical miles range and meters wide for an exemplary 2-degree beam. In a regular surveillance mode, radar 100 is unable to determine the number of aircraft 120a within group 120. In the normal surveillance mode, the beam sweeps through its full range of azimuth and elevation, as well as normal tracking. Conventional target detection means, such as a Kalman filter allows determination of the location (x, y, z) and velocity of targets.

In the discussion of processing below, the group 120 is referred to as a potential multiple target 120, because prior to completion of the raid counting mode processing, radar system 100 has not yet determined whether there is a single target or multiple targets 120a within range cell 111.

In the exemplary embodiment, the radar 100 is capable of being switched to operate in a raid counting mode upon detection of a possible incoming aircraft or missile threat. The raid-counting mode allows early detection and assessment of the presence of multiple targets within a range cell. When a potential multiple target 120 is detected, or where target classification criteria indicate that there may be multiple targets (e.g., airplane raid or missile attack), or where the target may be accompanied by decoy or debris, upon detection, the raid counting mode is entered to determine whether there is one target or multiple targets. In the raid-counting mode, surveillance is interrupted briefly, and an interrogation waveform is generated and transmitted in the direction of the potential multiple target 120.

In the raid-counting mode, super-resolution techniques use digital beamforming (DBF) to provide multiple degrees of freedom for resolving the number of targets within the range angle cell for the detection. Super-resolution is also made possible by transmitting consecutive pulses to the potential multiple target 120, and collecting and recursively processing a plurality of echo returns from the potential multiple target 120 within a sufficiently short period that the group 120 remains within the single range cell 111. During this short period, the potential multiple target can be considered substantially stationary, for purpose of maintaining the target within the single range cell to which the main beam is directed. In this context, recursive processing means that the algorithm for estimating the number of targets is repeated immediately for each consecutive echo return sampled from the potential multiple target 120. Since the range and speed of the approaching potential multiple target 120 are readily determined by conventional Kalman filter processing, the radar system 100 can readily estimate how long the target 120 will remain in the range cell 111 for this purpose.

A few different constraints define both the minimum and maximum number of pulses during the raid counting mode. The minimum number of pulses is generally the number required to reach convergence. The convergence criterion is satisfied, for example, if the estimated number of targets remains unchanged after the number of targets is recursively estimated a predetermined number of consecutive times, for example, two or three times without a change in the estimated number.

In general, if there are M targets, a good estimate of the number of targets is not achieved until there are more than M pulses. Further, accuracy depends on the signal to noise ratio (SNR). With a high SNR, five to seven pulses may be enough to get a good estimate for a group 120 containing five aircraft 120a. If the SNR is too low, ten to twelve pulses might be required to get a good estimate for the same number of aircraft within a single range cell. With low SNR, the number of targets determined by the algorithm is more likely to fluctuate up and down with successive samples. Thus, the number of targets that can be accurately resolved within any given range cell depend on the SNR.

Note that there are also concrete limits on the maximum number of pulses that can be transmitted (and corresponding echo returns sampled). As explained below, the fast processing algorithm used in the exemplary embodiment is based on the assumption that the potential multiple target 120 remains within the range cell 111 throughout the raid counting mode. For example, after about ten to twelve pulses, target motion may come into play. This limit is typically not a problem in detecting aircraft, because a large number of airplanes will likely not all be contained within a single range cell. However, if the estimated number of targets continues to grow with every sample, until the maximum number of samples is collected, this would be an indication that there is a large number of targets within the range cell. It is understood that such factors as the pulse width, duty cycle, beam solid angle, and the speed of the target all affect how many consecutive pulses can be transmitted while any given potential multiple target 120 is still within the single range cell.

Another constraint is the desire to perform the superresolution raid counting function without interfering with the primary surveillance and tracking mission of the radar system 100. The duration of the raid tracking mode is constrained to be sufficiently short that the radar 100 is not impaired in its ability to resume surveillance and continue tracking other targets (not shown) that were being tracked before the radar entered the raid counting mode. At the completion of the raid-counting mode, the radar 100 is automatically returned to its normal surveillance and tracking operations. It is expected that at least ten to twelve consecutive pulses can be transmitted in the raid counting mode without interfering with surveillance and tracking operations.

Figure 2:
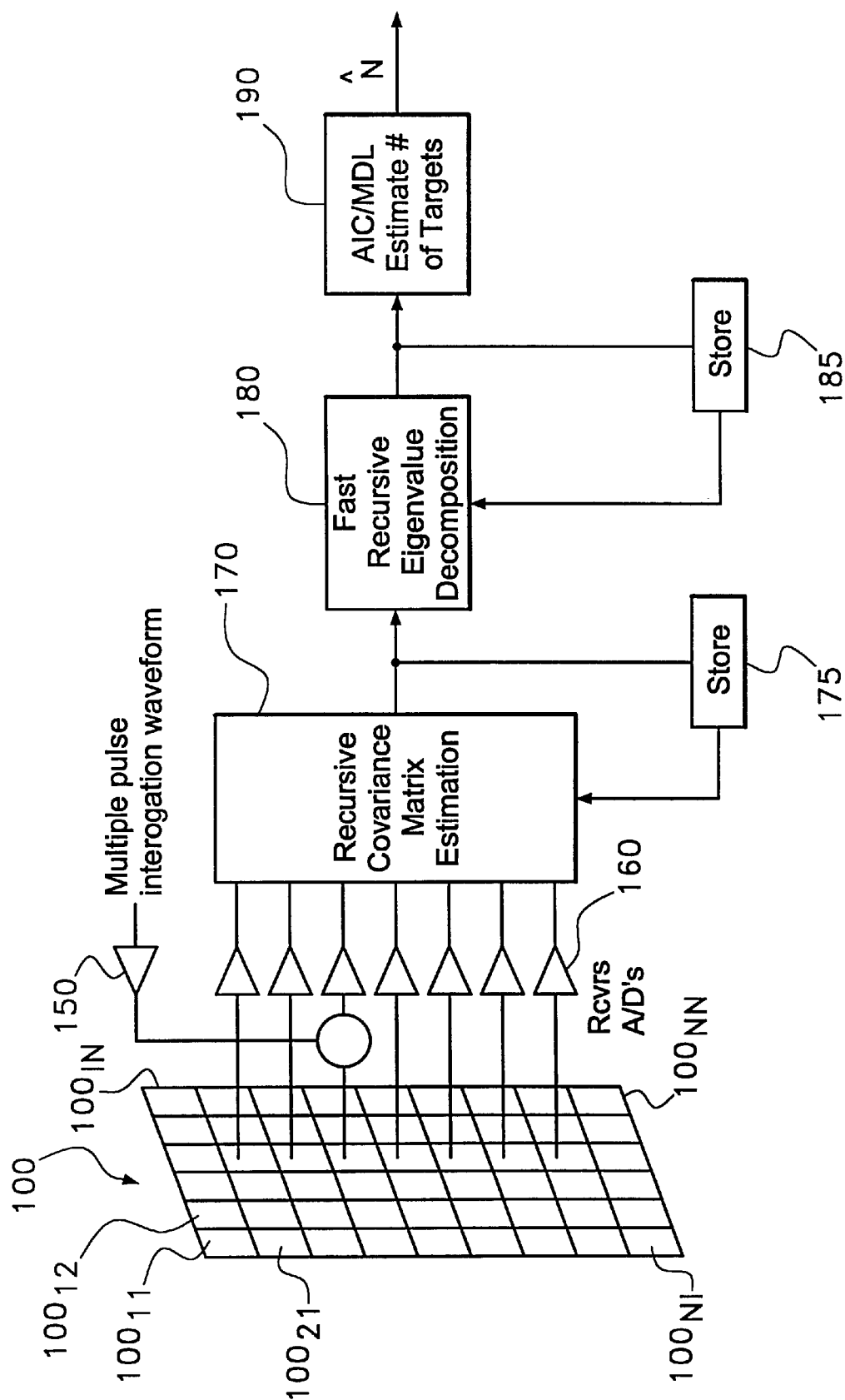
FIG. 2 is a block diagram of an exemplary system according to the present invention.

FIG. 2 is a block diagram of the exemplary signal processing functions that are operable in the raid counting mode, to estimate a number of aircraft 120a within the group 120 in range cell 111. The radar antenna 100 may be a conventional phased array monopulse antenna. Antenna 100 has a plurality of individual radiating elements $100_{11}, \ldots, 100_{NN}$.

The radar antenna 100 sends a set of consecutive pulses, and received respective echo signals from the consecutive pulses. A plurality of analog to digital converters (ADC's) 160 convert the analog signals from each element $100_{11}, \ldots, 100_{NN}$ to a respective digital signal. The antenna 100 has a digital beamformer for forming sum ($\Sigma$), azimuth difference ($\Delta_{AZ}$) and elevation difference ($\Delta_{EL}$) signals from the individual echo signals received by each element $100_{11}, \ldots, 100_{NN}$ of the antenna array 100. During normal adaptive DBF operation, a covariance matrix is generated in the course of developing adaptive beamforming coefficients, as is well known. In addition, in the exemplary embodiment, an eigenvalue decomposition is performed (by block processing) to calculate or renew the eigenvalue decomposition.

In block 170, a recursive covariance matrix estimation is formed based on each pulse sampled in the raid counting mode, each of which forms a snapshot of the measurement vector. The covariance matrix is saved in a storage device 175 (which may be, for example, any type of random access memory (RAM). This allows use of the most recently generated (or estimated) covariance matrix and the most recent sample data to form an estimated update to the covariance matrix.

In block 180, for each pulse sampled in raid counting mode, a fast recursive processing algorithm is used to update the eigenvalue decomposition of the covariance matrix. The number of significant eigenvalues of the covariance matrix determines the number of targets within the resolution cell. Eigenvalue decomposition is numerically intensive. Block processing or renewing the eigenvalue decomposition after each pulse may take too long a time to complete processing within a single pulse period. (depending on the speed of the processing hardware). Therefore, it is advantageous to perform a fast eigenvalue decomposition. An exemplary fast processing algorithm for this purpose is described further below. The eigenvalue decomposition results are stored in a memory device 185, which may be, for example, a RAM. The stored results can then be used to form an updated eigenvalue decomposition.

In block 190, a conventional algorithm such as the Akaike Information Criterion (AIC) or Minimum Description Length (MDL) may be used for refinement of the estimated number of targets. AIC is described in H. Akaike, "A New Look at the Statistical Model Identification," IEEE Trans.

Automatic Control, vol. 19, pp. 716–723, 1974, which is incorporated by reference herein in its entirety. MDL is described in M. Wax and T. Kailath, "Detection of signals by Information Theoretic Criteria," IEEE Trans. Acoustics, Speech and Signal Processing, vol. ASSP-33, No. 2, pp. 387–392, April 1985, which is incorporated by reference herein in its entirety. Other algorithms may also be used.

The recursive implementation allows early detection and assessment updates. As data are received, the covariance matrix is accumulated. Then the eigenvalue decomposition is recursively computed for every sample update for the one range cell. A fast determination is achieved with the recursive procedure. Thus, it takes very little time to update the covariance matrix and eigenvalue decomposition.

The above described raid counting mode and function can be added to existing DBF radar products, or included as an advanced feature for the next generation of early warning radar products.

Figure 3:
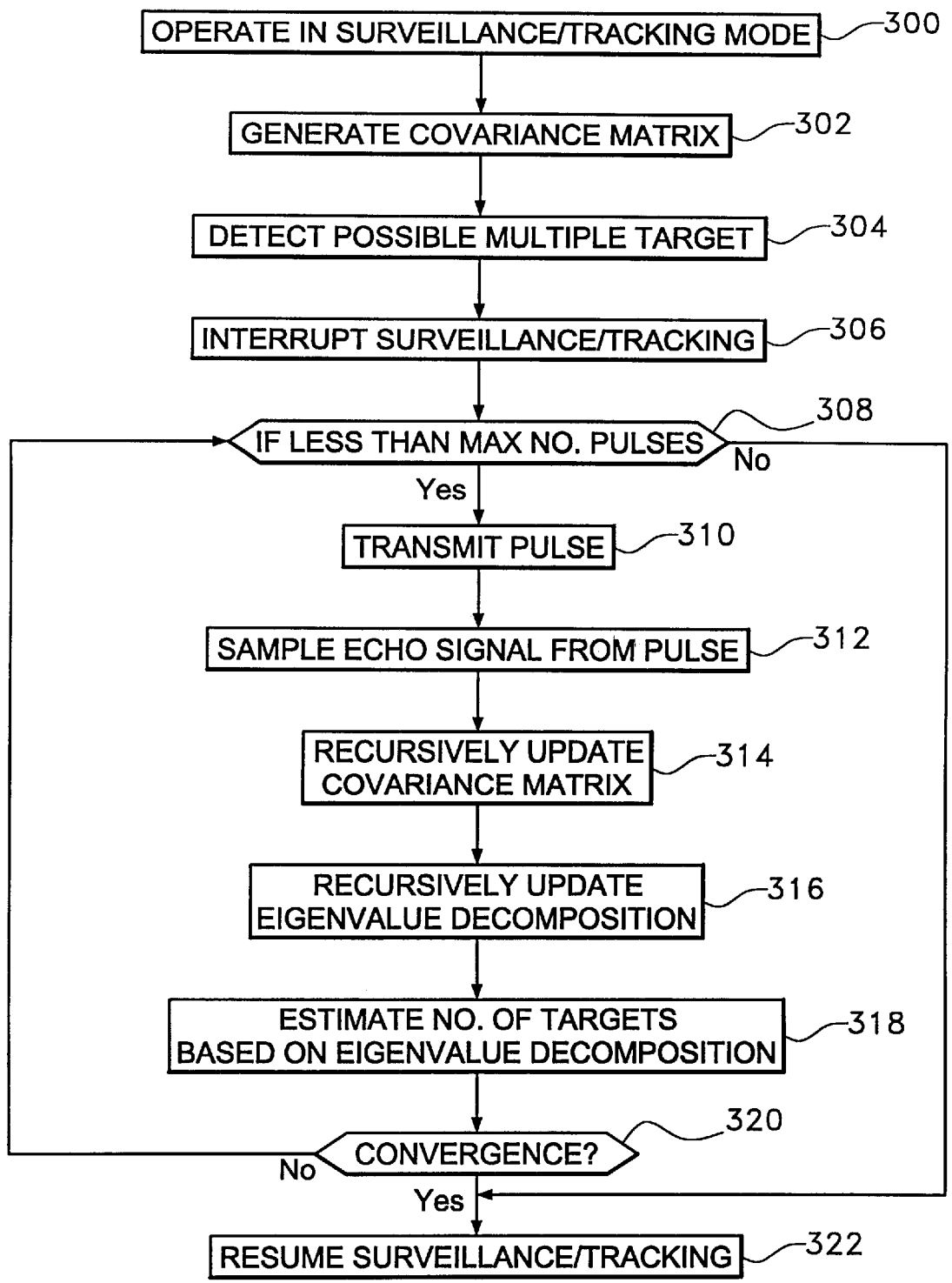
FIG. 3 is a flow chart diagram showing a method of practicing the invention.

FIG. 3 is a flow chart diagram of an exemplary method according to the invention. At step 300, the radar 100 is initially operated in surveillance mode, and may be tracking targets.

At step 302, the covariance matrix is initially generated based on detected echo signals.

At step 304, the system detects the presence of a potential multiple target 120. The position and velocity of the potential multiple target 120 are determined.

At step 306, the radar 100 automatically switches from the surveillance mode to the raid counting mode.

At step 308, a loop is entered. This loop, including steps 310–320, is repeated until the estimated number of targets converges, or the maximum number of pulses for the raid counting mode have been transmitted, whichever occurs first.

At step 310, a pulse is transmitted.

At step 312, the echo return from the pulse transmitted at step 310 is sampled.

At step 314, the covariance matrix is recursively updated with each sample.

At step 316, an estimate of the eigenvalue decomposition is updated.

At step 318, the number of targets in potential multiple target 120a is estimated.

At step 320, if the number of targets has converged, then step 322 is executed. If not, and the maximum number of pulses has not been reached, then steps 310–318 are repeated.

At step 322, the raid counting mode is completed, and the radar 100 returns to the surveillance mode.

Preferably, when a group of consecutive pulses are transmitted in a raid counting mode, the echo signals from each pulse are sampled and processed, to obtain the best estimate of the number of targets. However, it is contemplated that the invention can still be practiced in embodiments in which echoes from a subset of the pulses are processed. Thus, one or more of the echoes may be discarded or ignored. Further, although a relatively large number of pulses (e.g., 5–10 pulses) is preferred in the raid counting mode, the plurality of consecutive pulses may include any number of two or more pulses.

Eigenvalue Decomposition

Eigenspace decompositions are used in solving many signal processing problems, such as source location estimation, high-resolution frequency estimation, and beamforming. In each case, either the eigenvalue decomposition (EVD) of a covariance matrix or the singular value decomposition (SVD) of a data matrix is performed. For adaptive applications in a non-stationary environment, the EVD is updated with the acquisition of new data and the deletion of old data. This situation arises where the target sources are moving or the sinusoidal frequencies are varying with time. For computational efficiency or for real-time applications, an algorithm is used to update the EVD without solving the EVD problem from scratch again, i.e., an algorithm that makes use of the EVD of the original covariance matrix. In numerical linear algebra, this problem is called the modified eigenvalue problem. Other examples of modified eigenvalue problems include extension and restriction problems where the order of the matrix is modified, corresponding to filter order updating or downdating.

One aspect of the exemplary embodiment of the invention is the use of a fast recursive eigenvalue decomposition method in processing the radar echo signals in a raid-counting mode. Formally, these problems are concerned with computing the eigensystem of Hermitian matrices that have undergone finite changes that are of restricted rank. The rank values of the modified part are usually small compared with the rank values of the original matrices. In these situations, perturbation ideas relating the eigensystem of the modified and original matrices can be exploited to derive a computationally efficient algorithm.

In a time-varying environment, there are two strategies for updating the covariance matrix. The most common one is the rank-1 update, which involves applying an exponential forgetting window to the covariance matrix, i.e., $$\hat{R}=\mu R+(1-\mu)\alpha\alpha^H \qquad (1)$$

where $R$ and $\hat{R}$ correspond to the original and updated covariance matrices, respectively, $\mu$ is an appropriate exponential forgetting factor, and $a$ is the most recent data vector. The data vectors correspond to linear prediction sample vectors in frequency estimation or snapshots in array processing. The exponential window approach may have several drawbacks: the influence of old data can last for a very long time, and the exponential forgetting factor, $\mu$, must be determined appropriately.

Another strategy is to use a sliding window, which is analogous to short-time signal analysis, where data within the window is assumed to be stationary. This strategy corresponds to adding a row to and deleting a row from the data matrix, simultaneously, or to the following rank-2 covariance matrix update problem:

$$\hat{R}=R+\alpha\alpha^H-\beta\beta^H \qquad (2)$$

where $\alpha$ is the data vector to be included, and $\beta$ is the data vector to be deleted. The eigenvalue can be computed explicitly when the order of the matrix is less than 5 (say, 3 or 4) after deflation. One can also add and delete blocks of data, leading to the general rank-$\kappa$ modification problem, and one can modify equation (2), or the rank-$\kappa$ modification problem, by adding weighting factors, thus indicating the relative weight of the previous covariance matrix and the new data vector in forming the new covariance matrix estimate.

Simultaneous data addition and deletion have also been considered in other signal processing applications such as recursive least squares problems. Of course, the modification problem can be solved by applying a rank-1 update as many times as desired. That approach is computationally involved because nonlinear searches for eigenvalues have to be carried out for each rank-1 update, and the procedure is repeated for κ times. Solving this eigenvalue search problem in an efficient way speeds up the process. It should also be noted that subtracting data may lead to ill-conditioning, since the smallest eigenvalue may move toward zero. Theoretically, this should not happen because only different segments of data are used for forming the covariance matrix. Numerically, the ill-conditioning may happen; thus, in general, data subtraction should be avoided. The choice of updating schemes depends on specific applications and assumptions in signal sources. The exemplary embodiment of the present invention provides an algorithm for recursively updating the EVD of the covariance matrix when the covariance matrix is under low-rank updating, which may include data deleting.

An overview of the modified eigenvalue problem for raid counting is provided herein and its application to the recursive updating of the eigen-subspace when the covariance matrix is under low-rank updating. It includes a theoretical framework in which rank-κ updates are related to one another. The spectrum-slicing theorem enables location of the eigenvalue to any desired accuracy by means of the inertia of a much reduced size Hermitian matrix whose elements depend on the eigenvalue parameter, λ. This idea is incorporated and a complete algorithm and analysis is worked out for updating the eigen-decomposition of the covariance matrix as it arises in eigenbased techniques for frequency or angle of arrival estimation and tracking. A novel algorithm is employed for computing the eigenvector and work out the deflation procedure for rank-κ updates. The efficient procedure for computing eigenvalues is a two-step procedure. It improves the computational complexity from $O(N^3)$ to $O(N^2 k)$. The deflation procedure is important for the eigen-subspace updating in high-resolution algorithms, as high filter order leads to multiplicity of noise eigenvalues. If only the principal eigenvalues and eigenvectors need to be monitored (as in the PE algorithm), the noise eigenvalue multiplicity consideration would lead to a highly efficient algorithm. An analysis of the computational complexity indicates an improvement of an order of magnitude from $O(N^3)$ to $O(N^2 k)$ when compared with prior known routines. The most efficient EVD routines involve Householder reduction to tridiagonal form followed by QL iteration.

An efficient algorithm for computing the eigensystem of the modified covariance matrix is described is below. The algorithm involves a nonlinear search for the eigenvalues that can be done in parallel. Once the eigenvalues are obtained, the eigenvectors can be computed explicitly in terms of an intermediate vector, which is a solution of a deflated homogeneous linear system. The general procedure, coupled with the multiplicity of noise eigenvalues in subspace signal processing applications, leads to a highly efficient algorithm for adaptive estimation or tracking problems.

II. Updating the EVD of the Covariance Matrix (A) Modified Eigenvalue Problem

The modified eigenvalue problem is concerned with computing the eigensystem of the modified Hermitian matrix, given the a priori knowledge of the eigensystem. of the original matrix. This specifically concerns the following additive modification:

$$\hat{R}=R+E \quad (3)$$

where $\hat{R}$ and $R$ and $R \in C^{N \times N}$ are the modified and original covariance matrices and $E \in C^{N \times N}$ is the additive modification matrix. This matrix is also Hermitian, and, in general, is of indefinite nature; i.e., it may have negative eigenvalues (corresponding to downdating). Assume E is of rank k, where k is usually much smaller than N. Because E is Hermitian, it has the following weighted outer product expansion:

$$E=USU^H \quad (4)$$

where $U \in C^{N \times k}$ and $S \in R^{k \times k}$ is a nonsingular matrix. For example, equation (4) can be obtained as the eigenvalue and eigenvector expansion of E, where S is a diagonal matrix with eigenvalues on the diagonal and U is the corresponding orthonormal eigenvector matrix. Another example for the decomposition of E, as shown in equation (4), is expressed directly in terms of the data. In that case, S has diagonal elements equal to 1 or −1, corresponding to updating or downdating, respectively, and U is the matrix with the corresponding data vectors. U is then not orthonormal. A priori information of the EVD of R is also available as follows:

$$R=QDQ^H \quad (5)$$

where $D \in R^{N \times N}$, $Q \in C^{N \times N}$, $D=\text{diag}[d_1, d_2 \ldots d_N]$ is the diagonal eigenvalue matrix, and $Q=[q_1, \ldots q_N]$ is the corresponding eigenvector matrix. Note that Q is an orthonormal matrix, i.e., $$QQ^H=Q^HQ=I \quad (6)$$

The problem now is to find the modified eigensystem. Assuming that λ, x are the eigenpairs, of R, the following expression is obtained:

$$(\hat{R}-\lambda I)x=0 \quad (7)$$

The eigenvalue can be determined by solving for the zeros of $$det[\hat{R}-\lambda I]=0 \quad (8)$$

Substituting $\hat{R}$ from (3) and E from (4) into (7) gives the following expression:

$$(R-\lambda I)x+USU^H x=0 \quad (9)$$

It is convenient to split away the rank-k modification aspect from the rest of the problem by inducing the following system of equations, where $y=SU^H x$ and $y \in C^k$:

$$(R-\lambda I)x+Uy=0 \quad (10a)$$

$$U^H x-S^{-1}y=0 \quad (10b)$$

Solving x in terms of y in (10a) and substituting it into (10b) gives the following:

$$W(\lambda)y=0 \quad (11)$$

where $$W(\lambda)=S^{-1}+U^H(R-\lambda I)^{-1}U \quad (12)$$

Note that $W(\lambda)$ can be identified to be the Schur complement of $R-\lambda I$ in $M(\lambda)$[26] where $$M(\lambda) = \begin{bmatrix} R - \lambda I & U \\ U^H & -S^{-1} \end{bmatrix} \quad (13)$$

$W(\lambda)$ is also called the Weinstein-Aronszajn (W-A) matrix, which arises in perturbation problems in Hilbert space operators. The modified eigenvalues can be obtained from solving $\det[W(\lambda)]=0$ rather than from equation (8). In fact, $\lambda$ is an eigenvalue of $\hat{R}$, i.e., $\lambda \in \lambda(\hat{R})$ if and only if $\lambda$ is a solution of $\det[W(\lambda)]=0$. This can be derived easily by using the known Schur equation on equation (13), leading to $$\det[R - \lambda I] = \frac{\det[M(\lambda)]}{\det[S^{-1}]} \quad (14)$$

Because S is invertible, $\det[\lfloor \hat{R} - \lambda I \rfloor]=0$ will imply $\det[M(\lambda)]=0$. Also, $\det[M(\lambda)]$ can be expressed as $$\det[M(\lambda)] = (-1)^k \det[R - \lambda I] \det[W(\lambda)]$$

leading to $$\det[W(\lambda)] = (-1)^k \frac{\det[M(\lambda)]}{\det[R - \lambda I]} \quad (15)$$

$$= (-1)^k \frac{\prod_{i=1}^{N}(\hat{\lambda}_i - \lambda)}{\prod_{i=1}^{N}(\lambda_i - \lambda)}$$

with $\hat{\lambda}_i \in \lambda(\hat{R})$ and $\lambda_i \in \lambda(R)$. Thus $\{\hat{\lambda}_i\}$ and $\{\lambda_i\}$ are the zeros and poles of the rational polynomial $\det[W(\lambda)]$. Note that the above derivation is valid only when the eigenvalues of $R$ and $\hat{R}$ are distinct. In fact, $R - \lambda I$ in equation (12) is not invertible when $\lambda$ coincides with one of the eigenvalues of $R$. A deflation procedure is prescribed when some of the eigenvalues of the modified and original matrices are in fact the same. Note that $w(\lambda) = \det[W(\lambda)]$ is a nonlinear equation, which is easy to evaluate. $W(\lambda)$ is a k×k matrix which is of a dimension much smaller than the N×N matrix $\hat{R} - \lambda I$. Moreover, the resolvant $(R - \lambda I)^{-1}$ is easy to compute if the EVD of R is available, i.e., $$W(\lambda) = S^{-1} + U^H Q(D - \lambda I)^{-1} Q^H U \quad (16)$$

where $(D - \lambda I)$ is a diagonal matrix. The fast algorithm to be described depends on a spectrum-slicing theorem relating the eigenvalues of the modified matrix to the eigenvalues of the original matrix. This theorem enables the search to be localized in any interval. Moreover, the search can be carried out in parallel, leading to an efficient implementation.

Deflation

Several situations exist for deflating the problem. The details of two situations are described: (1) U is orthogonal to $q_i$, and (2) there are multiplicities of the eigenvalues of the original covariance matrix. The consideration here is for rank-k update. Other special situations exist where the problem can be deflated immediately, such as the existence of zero elements in the update vector. For the first case, $q_i^H U = 0$; therefore $d_i$ and $q_i$ remain the eigenpair of the modified matrix $\hat{R}$. For the second case, if $\lambda$ is an eigenvalue of multiplicity m with the corresponding set of eigenvectors $Q = [q_i \ldots q_m]$, it is then possible to perform a Householder transformation on Q, such that the last M−1 eigenvalues are orthogonal to $u_1$ (where $U = [u_1 \ldots u_k]$), i.e., $$QH_1 = \lfloor q_1^{(1)} \ldots q_m^{(1)} \rfloor \triangleq Q^{(1)} \quad (17a)$$

$$q_i^{(1)H} u_1 = 0 \quad i=2, \ldots m \quad (17b)$$

Thus, $\{q_i^{(1)}\}_{i=2}^m$ remain the eigenvectors of $\hat{R}$ corresponding to eigenvalue $\lambda$. The Householder matrix $H_1$ is an orthogonal matrix given by $$H_1 = 1 - \frac{2(b_1 b_1^H)}{b_1^H b_1} \quad (18)$$

where $$b_1 = z + \sigma e_i$$

with $Q^H u_1 = z$, $\sigma \|z\|_2$ and $e_1 = [1, 0 \ldots 0]^H$. Now let $Q_1 = [q_2^{(1)} \ldots q_m^{(1)}]$, and after performing another appropriate Householder transformation, we obtain $$\hat{Q}^{(1)} H_2 = [q_2^{(2)} q_3^{(2)} \ldots q_m^{(2)}] q_i^{(2)H} u_2 = 0 \quad i=3, \ldots m \quad (19)$$

After continuing this procedure k times until $$\hat{Q}^{(k-1)} H_k = [q_k^{(k)} q_{k+1}^{(k)} \ldots q_m^{(k)}] q_i^{(k)H} u_k = 0 \quad i=k+1, \ldots m \quad (20)$$

then $\{q_i^{(k)}\}_{i=k+1}^m$ are the eigenvectors of $\hat{R}$ with $\lambda \in \lambda(\hat{R})$ of multiplicity m−k.

Spectrum-Slicing Theorem

Assuming all deflation procedures have been carried out, i.e., all $d_i$ are distinct and $q_i^H U = 0$, a computationally efficient algorithm can be used to locate the eigenvalues to any desired accuracy. The fast algorithm that allows one to localize the eigenvalue search depends on the following spectrum-slicing equation:

$$N_{\hat{R}}(\lambda) = N_R(\lambda) + D^+[W(\lambda)] - D^+[S] \quad (21)$$

where $N_{\hat{R}}(\lambda)$ and $N_R(\lambda)$ are the number of eigenvalues of $\hat{R}$ and R less than $\lambda$, respectively, $D^+[W(\lambda)]$ is the positive inertia of $W(\lambda)$ (i.e., the number of positive eigenvalues of $W(\lambda)$ and, likewise, $D^+[S]$ is the positive inertia of S. The above spectrum-slicing equation (21) provides information of great computational value. $W(\lambda)$ is easy to compute for each value of $\lambda$. If $Q^H U$ is computed and stored initially, the dominant cost is on the order of $Nk^2$ floating-point operations per evaluation. Upon evaluating the W-A matrix $W(\lambda)$, one may then compute its inertia efficiently from an $LDL^H$ or the diagonal pivoting factorization. This requires $k^3$ number of operations. The value of $N_R(\lambda)$ is available readily, as the EVD of R. $D^+[S]$ can be determined easily either from the EVD of E (because only a few eigenvalues are nonzero) or from counting the number of the data vectors to be added (assuming they do not align with each other). This needs to be determined only once. The spectrum-slicing equation provides an easy mechanism for counting the eigenvalues of $\hat{R}$ in any given interval. This information enables one to localize the search in much the same way as Sturm sequence/bisection techniques are used in polynomial root finding. The bisection scheme can be carried out until convergence occurs. The convergence rate is linear. The eigenvalue search algorithm can be summarized as follows:

1. Use the knowledge of the original spectrum and equation (21) to localize the eigenvalues to disjoint intervals.
2. For each iteration step of each eigenvalue search in the interval (l,u) set $$\lambda = \frac{1+u}{2},$$

and test it with $N_R(\lambda)$ (equation (21)). Repeat until convergence to desired accuracy.

Since the distribution of the eigenvalue of the original matrix is known, the eigenvalues can be localized to disjoint intervals easily by using equation (21). For the bisection search, the dominant cost for each iteration is the evaluation of $W(\lambda)$ and the $LDL^H$ decomposition for the evaluation of $W(\lambda)$.

This algorithm can be illustrated by considering the following numerical example. Let the original covariance matrix be given by R=diag(50, 45, 40, 35, 30, 25, 20, 15, 10, 5). Thus the eigenvalues are the diagonal elements, and the eigenvectors are the unit vectors $\{e_i\}_{i=1}^{10}$. Now assume the covariance matrix undergoes the following rank-3 modification given by $$\hat{R} = R + u_1 u_1^t + u_2 u_2^t + u_3 u_3^t$$

where $u_1$, $u_2$, and $u_3$ are randomly generated data vectors given by [0.3563, −0.2105, −0.3559, −0.3566, 2.1652, −0.5062, −1.1989, −0.8823, 0.7211, −0.00671$^t$ [−0.5539, −0.4056, −0.3203, −1.0694, −0.5015, 1.6070, 0.0628, −1.6116, −0.4073, −0.59501$\}^t$, and [0.6167, −1.1828, 0.3437, −0.3574, −0.4066, −0.3664, 0.8533, −1.5147, −0.7389, 2.1763]$^t$. Thus S=diag(1,1, 1) and D$^+$[S]=3. For this example, the resulting eigenvalues are $\hat{\lambda}$=(51.1439,47.1839, 40.6324, 36.9239, 36.0696, 27.6072, 22.1148, 20.0423, 11.0808, 8.6086). Now let us illustrate how (21) can be used to locate the eigenvalues accurately. Start with the interval (20, 25). The associated W-A matrices are evaluated and the inertias computed. The counting formulas evaluated at 20+ϵ and 25−ϵ ($N_R(25-\epsilon)=4$, $N_R(20+\epsilon)=2$, ϵ=a small constant depending on accuracy requirement) indicate that there are two eigenvalues in the interval (20, 25).

This interval is then split into intervals (20, 22.5) and (22.5, 25). Evaluating equation indicates that an eigenvalue has been isolated in each disjoint interval. Bisection can then be employed to the desired accuracy. Table 1 illustrates the iteration steps for the interval (20, 21.25) for an accuracy of $10^{-3}$ digits. It converges to 20.0425 in 12 steps. The maximum number of iterations required for convergence depends on the interval, (l,u), to be searched and the accuracy requirement, ϵ. This number q can be determined such that $2^q > (u-l)/\epsilon$ and is given by Table 2.

TABLE 1

Bisection Search for Eigenvalues Using the Spectrum-Slicing Equation

| Bisection Step | Interval | Mid-point | $N_R(\lambda)$ | D$^+$[W($\lambda$)] | $N_R(\lambda)$ |
|---|---|---|---|---|---|
| 1 | (20, 21.25) | 20.625 | 4 | 2 | 3 |
| 2 | (20, 20.625) | 20.3125 | 4 | 2 | 3 |
| 3 | (20, 20.3125) | 20.1563 | 4 | 2 | 3 |
| 4 | (20, 20.1563) | 20.0782 | 4 | 2 | 3 |
| 5 | (20, 20.0782) | 20.0391 | 4 | 1 | 2 |
| 6 | (20.0391, 20.0782) | 20.0587 | 4 | 2 | 3 |
| 7 | (20.0391, 20.0587) | 20.0489 | 4 | 2 | 3 |
| 8 | 20.0391, 20.0489) | 20.044 | 4 | 2 | 3 |
| 9 | (20.0391, 20.044) | 20.0416 | 4 | 1 | 2 |
| 10 | (20.0416, 20.044) | 20.0428 | 4 | 2 | 3 |
| 11 | (20.0416, 20.0428) | 20.0422 | 4 | 1 | 2 |
| 12 | (20.0422, 20.0428) | 20.0425 | 4 | 2 | 3 |

When an interval has been found to contain a single eigenvalue, $\lambda$, then bisection is a rather slow way to pin down $\lambda$, to high accuracy. To speed up the convergence rate, a preferable strategy would be to switch to a rapidly root-finding scheme after the roots have been sufficiently localized within subintervals by using the counting equation. Root-finding schemes, including variation of secant methods, can be employed. The order of convergence is 1.618 for secant methods, as against 1 for bisection. Thus convergence can be accelerated.

Eigenvector

Once the eigenvalues are obtained, the eigenvectors can be evaluated efficiently in two steps. First, the intermediate vector y can be solved from the k×k homogeneous Hermitian system (11). y can actually be obtained as the byproduct of the $LDL^H$ decomposition of $W(\lambda)$; i.e., y is the zero eigenvector of $W(\lambda)$ for the convergent eigenvalue $\lambda$. The eigenvector x can then be computed explicitly using equation (10a). This two-step procedure is much more efficient than solving the original N×N homogeneous system of equation (7) or the conventional eigenvector solver using the inverse iteration. The explicit expression x relating y is given by $$x = -(R - \lambda I)^{-1} Uy \qquad (22a)$$

$$= -Q(D - \lambda I)^{-1} Q^H Uy$$

$$= -\sum_{i=1}^{N} \frac{q_i^H Uy}{(d_i - \lambda)} q_i$$

Normalizing x gives the update eigenvectors $\hat{q}$, i.e., $$\hat{q} = \frac{x}{\|x\|_2} \qquad (22b)$$

TABLE 2

| Number of Subintervals to be Searched | Number of Iteration Steps |
|---|---|
| $10^2$ | 7 |
| $10^3$ | 10 |
| $10^4$ | 14 |
| $10^5$ | 17 |
| $10^6$ | 20 |

The computational complexity for solving the k×k homogeneous Hermitian system is $O(k^3)$ and the back substitution of equation (22) involves an order of magnitude $O(N^2 k)$. This is to be contrasted to the Householder reduction followed by QL Implicit Shift, which requires complexity of order of magnitude $O(N^3)$. Similarly, the inverse iteration requires $O(N^3)$. This represents an order of magnitude improvement from $O(N^3)$ to $O(N^2 k)$.

For completeness, a discussion on the rank-1 and rank-2 updates is provided. Since $w(\lambda)$ and its derivatives can be evaluated easily for these two cases, Newton's method can be employed for the eigenvalue search. Some new results were obtained as we worked out the complete algorithm, including the deflation procedure (for high-order rank updates), bounds for the eigenvalues (derived from the spectrum-slicing theorem instead of DeGroat and Roberts' generalized interlacing theorem), as well as the explicit eigenvector computation.

(B) Rank-1 Modification

For rank-1 updating modification $\hat{R} = R + \alpha\alpha^H$, the modification matrix E can be identified with $E = \alpha\alpha^H$, corresponding to the decomposition equation (4) with $U=\alpha$ and $S=1$. $W(\lambda)$ is a 1×1 matrix, which is also equal to the determinant $w(\lambda)$, i.e., $$w(\lambda) = 1 + \alpha^H(R - \lambda I)^{-1}\alpha \qquad (23)$$

$$= 1 + \sum_{i=1}^{N} \frac{|q_i^H \alpha|^2}{(d_i - \lambda)}$$

This is a rational polynomial, with N roots corresponding to N eigenvalues.

It is assumed that this is an N×N problem for which no deflation is possible. Thus, all $d_i$ are distinct, and $q_i^H\alpha \neq 0$. The eigenvalues $\lambda_i$, of the rank-1 modified Hermitian matrix satisfy the following interlacing property:

$$d_i < \lambda_i < d_{i-1} \quad i=1,2,\ldots N \qquad (24a)$$

with $d_0 = d_1 + |\alpha|^2$. Therefore, the search intervals for each $\lambda_i$ can be restricted to $I_i = (d_i, d_{i-1})$ for all $i=1,2,\ldots N$. For downdating, $\hat{R} = R - \beta\beta^t$, the interlacing equation is given by $$d_{i+1} < \lambda_i < d_i \quad i=1,2,\ldots N \qquad (24b)$$

where $d_{N+1} = d_N - |\beta|^2$. The corresponding search intervals for each $\lambda$ can be restricted to $I=(d_{i+1}, d_i)$. An iterative search technique can then be used on $w(\lambda)$ to identify the updated eigenvalues. The function $w(\lambda)$ is a monotone increasing function between its boundary points because $$w'(\lambda) = \sum_{i=1}^{N} \frac{|q_i^H \alpha|^2}{(d_i - \lambda)^2} > 0 \qquad (25)$$

Thus, the following Newton's method, safeguarded with bisection, can be applied in an iterative search to identify the j-th eigenvalue, $\lambda$. For convenience, let us denote the endpoints of the interval by $l=d_j$, and $u=d_{j-1}$. The full set of eigenvalues can be solved in parallel by using the following iterative algorithm for each eigenvalue:

$$\lambda_*^{(k+1)} = \lambda^{(k)} - \frac{w(\lambda^{(k)})}{w'(\lambda^{(k)})} \qquad (26)$$

$$\lambda^{(k+1)} = \begin{cases} \lambda_*^{(k+1)} & \text{if } \lambda_*^{(k+1)} \in I_j \\ \frac{\lambda^{(k)}+u}{2} & \text{if } \lambda_*^{(k+1)} \rangle u, \lambda^{(k)} \text{ replaces } l \\ \frac{\lambda^{(k)}+l}{2} & \text{if } \lambda_*^{(k+1)} \langle l, \lambda^{(k)} \text{ replaces } u \end{cases} \qquad (27)$$

and stopping if $|\lambda^{(k+1)} - \lambda^{(k)}| < \delta \lambda^{(k+1)}$, where $\delta$ is the convergence threshold. Note that when an iteration goes outside the restricted zone, since the gradient is greater than zero, this indicates the direction in which the solution is to be found. Consequently, the interval can be further restricted as indicated. Newton's method is guaranteed to converge, and this convergence is quadratic near the solution. It should be noted that Newton's method is based on a local linear approximation to the function $w(\lambda)$. Since $w(\lambda)$ is a rational function, it is possible to speed up the convergence rate by using simple rational polynomials for local approximations.

Once the eigenvalues are determined to sufficient accuracy, the eigenvector can be solved in a procedure described in (24). It is given explicitly as follows:

$$x = -\sum_{i=1}^{N} \frac{q_i^H \alpha}{(d_i - \lambda)} q_i \qquad (28a)$$

$$\hat{q} = \frac{x}{\|x\|_2} \qquad (28b)$$

Exponential Window Rank-1 Update

This procedure can be modified to accommodate the exponential window easily. For the following exponential window, rank-1 updating modification $\hat{R} = \mu R + (1-\mu)\alpha\alpha^H$ the Weinstein-Aronszajn matrix $W(\lambda)$ is a 1×1 matrix, which is also equal to the determinant $w(\lambda)$, $$w(\lambda) = 1 + (1-\mu)\alpha^H(\mu R - \lambda I)^{-1}\alpha \qquad (29)$$

$$= 1 + (1-\mu)\sum_{i=1}^{N} \frac{|q_i^H \alpha|^2}{(\mu d_i - \lambda)}$$

The N roots are the updated eigenvalue. They must satisfy the following modified interlacing property:

$$\mu d_i < \lambda_i < \mu d_{i-1} \quad i=1,2,\ldots N \qquad (30)$$

With $ud_0 = ud_1 + |\alpha|^2$. Therefore, the search intervals for each $\lambda_i$ can be restricted to $I_i = (\mu d_i, \mu d_{i-1})$ for all $i=1,2 \ldots N$. Assuming eigenvalues do not change dramatically from one update to another, $d_i$ would be a good initial estimate for $\lambda_i$. Once the eigenvalues are determined to sufficient accuracy, the eigenvector is given explicitly as follows:

$$\hat{x}_i = -(1-u)\sum_{k=1}^{N} \frac{(q_k^H \alpha)q_k}{(\mu d_k - \lambda_i)} \qquad (31)$$

This can be normalized accordingly.

(C) Rank-2 Modification

For a rank-2 modification problem, equation (4) can be expressed in the following:

$$\hat{R} = R = [\alpha\beta]\begin{bmatrix} 1 & 0 \\ 0 & -1 \end{bmatrix}\begin{bmatrix} \alpha^H \\ \beta^H \end{bmatrix} \qquad (32)$$

$$= R + USU^H$$

where $U=[\alpha\beta]$ and $S=\text{diag}(1, -1)$. The Weinstein-Aronszajn matrix $W(\lambda)$ is now given by $$W(\lambda) = S^{-1} + U^H Q(D - \lambda I)^{-1} Q^H U \qquad (33)$$

Let $Q^H U = [yz]$ and $W(\lambda)$ can be computed easily with the following expression for the determinant $w(\lambda)$ $$w(\lambda) = \left(1 + \sum_{i=1}^{N} \frac{|y_i|^2}{(d_i - \lambda)}\right)\left(1 - \sum_{i=1}^{N} \frac{|z_i|^2}{(d_i - \lambda)}\right) + \left(\sum_{i=1}^{N} \frac{y_i^H z_i}{(d_i - \lambda)}\right)\left(\sum_{i=1}^{N} \frac{z_i^H y_i}{(d_i - \lambda)}\right) \qquad (34)$$

Assuming all deflation procedures have been carried out, i.e., all $d_i$ are distinct and $q_i^H \alpha \neq 0$, $q_i^H \beta \neq 0$, simultaneously, the interlacing property relating the modified eigenvalues to the original eigenvalues is much more complicated than the rank-1 case. Combining the interlacing theorems for the rank-1 update equation (24a) and the rank-1 downdate equation (24b) simultaneously, provides the following generalized interlacing theorem for the rank-2 update:

$$d_{i+1} < \hat{\lambda}_i < d_{i-1} \tag{35}$$

where $d_{N+1} = d_N - |\beta|^2$ and $d_0 = d_1 + |\alpha|^2$. That is, the modified eigenvalues are bounded by the upper and lower eigenvalues, of the original covariance matrix. In this situation, each interval may have zero, one, or two eigenvalues. Fortunately, the spectrum-slicing equation can be used to isolate the eigenvalues in disjoint intervals. Once the eigenvalues are isolated, Newton's method can be employed for the eigenvalue search. This nonlinear search can be implemented in parallel as for the rank-1 case.

The eigenvector can be determined in two steps. First, an intermediate vector, y, can be obtained as the solution of the homogeneous system equation (11), and the eigenvector, x, can be obtained explicitly in terms of y, as in equation (22). Since k=2, we can specify the homogeneous system solution $y = [1v]^H$. Solving $W(\lambda) y = 0$ gives v $$v = -\frac{(1+a)}{b} \tag{36}$$

where $$a = 1 + \sum_{i=1}^{N} \frac{|y_i|^2}{(d_i - \lambda)} \quad \text{and} \quad b = \sum_{i=1}^{N} \frac{y_i^H z_i}{(d_i - \lambda)}$$

Using equation (24) we have the following explicit expression for the eigenvector $$x = -\sum_{i=1}^{N} \frac{y_i + v z_i}{(d_i - \lambda)} q_i \quad \text{and} \quad q = \frac{x}{\|x\|_2} \tag{37}$$

(D) Signal and Noise Subspace Updates with Multiplicity

In many applications, it is convenient to decompose the eigenvalues and eigenvectors into signal and noise eigenvalues and eigenvectors, respectively, i.e., $$\lambda_1 \geq \lambda_2 \geq \ldots \geq \lambda_M ) \underbrace{\lambda_{M+1} \approx \ldots \approx \lambda_N}_{=\sigma^2} \tag{38}$$

and $$S = [q_1 q_2 \ldots q_M] \tag{39}$$

$$N = [q_{M+1} \ldots q_N] \tag{40}$$

The first M eigenvalues are the signal eigenvalues corresponding to M complex sinusoids in frequency estimation or M target sources in array processing. The last N−M eigenvalues cluster to each other and correspond to the noise level. S and N are the signal and noise subspace, respectively. For a rank-1 update, the first M+1 eigenvalues and eigenvectors are modified, and the last N−M−1 eigenpairs stay the same. In order to conform to the model for M sources, we have the following update equation for eigenvalues:

$$\hat{\lambda}_1 \geq \hat{\lambda}_2 \geq \ldots \geq \hat{\lambda}_M \hat{\sigma}^2 \tag{41}$$

where $$\hat{\sigma}^2 = \frac{\hat{\lambda}_{M+1} + (N - M - 1)\sigma^2}{(N - M)} \tag{42}$$

Similarly, for a rank-k update, the first M+k eigenpairs are modified, and the rest remain the same. We have the following update equation for the noise eigenvalues according to the model given by equation (38):

$$\hat{\sigma}^2 = \frac{\hat{\lambda}_{M+1} + \hat{\lambda}_{M+2} + \ldots \hat{\lambda}_{M+k} + (N - M - k)\sigma^2}{(N - M)} \tag{43}$$

If, in fact, there are only M sources, $\{\hat{\lambda}_{M+i}\}_{i=1}^{k}$ should be close to $\sigma^2$. If $\{\hat{\lambda}_{M+i}\}_{i=1}^{k}$ are not close to $\sigma^2$ there may be another sinusoid or target. This observation can be used for detection of new sources.

(E) Computational Complexity

Note that rather different techniques are used in the fast algorithm and in the conventional algorithm for solving the eigensystem. Basically, the present algorithm involves iterative search for eigenvalues (using the $LDL^H$ decomposition together with the spectrum-slicing equation) and then subsequent eigenvector computation. However, all modem eigensystem solvers involve similarity transformation for diagonalization. If a priori knowledge of the EVD of the original covariance matrix were not available, the similarity transformation technique would be generally preferred, since it has better computational efficiency and numerical properties. The present fast algorithm makes use of the fact that the eigenvalue of the modified matrix is related to the eigenvalue of the original matrix. Moreover, the eigenvalue can be isolated to disjoint intervals easily and simultaneously searched in parallel. It can be located to any desired accuracy by using a spectrum-slicing equation requiring evaluation of the inertia of a much-reduced-size (k×k) Hermitian matrix. In this situation, the computational complexity is evaluated and compared with the complexity of the conventional eigensystem solver. The results are compared with distinct eigenvalue situations. Further reduction in computational complexity can be achieved when the multiplicity of the noise eigenvalues can be exploited as discussed above in the Signal and Noice Subspace Updates section.

The grand strategy of almost all modem eigensystem solvers is to push the matrix R toward a diagonal form by a sequence of similarity transformations. If the diagonal form is obtained, then the eigenvalues are the diagonal elements, and the eigenvectors are the columns of the product matrices. The most popular algorithms, such as those used in IMSL, EISPACK, or the *Handbook for Automatic Computation*, involve the following two steps: (1) Householder transformation to reduce the matrix to tridiagonal form and (2) the QL algorithm with an implicit shift to diagonalize it. In the limit of large N, the operation count is approximately $4\frac{1}{3}N^3$.

For the algorithm described herein, the efficiency depends on the fact that the eigenvalues can be isolated easily and thus searched in parallel. For each iteration step, $W(\lambda)$ is evaluated and the inertia computed. The overall computational complexity is summarized as follows:

| Function | No. of Operations |
|---|---|
| Overhead | |
| Evaluate $S^-$ | $k$ |
| Evaluate $Q^H_1 = Q^H U$ | $N^2 k$ |
| Evaluate $\{q_{1i} q_{1i}\}^N_{i=1}$ | $Nk^2$ |
| Total | $N^2 k + Nk^2 + k = N^2 k$ |
| Eigenvalue | |
| Evaluate $W(\lambda)$ | $Nk^2$ |
| $LDL^H$ decomposition | $k^3$ |
| Total for $N_i$ number of iterations | $N_i(Nk^2 + k^3) = N_i Nk^2$ |
| Eigenvector | |
| Backsubstitution | $N^2(k+1) - N^2 k$ |
| Total (overhead, eigenvalue, eigenvector) | $2 N^2 k + N_i Nk^2$ |

Thus, in general, the computational complexity is of order $2N^2 k + N_i Nk^2$. It corresponds to an improvement from $4⅓N^3$ to $2N^2 k + N_i Nk^2$.

(F) Numerical Properties

It should be noted that the eigenvalue can be determined to any desired accuracy by using the spectrum-slicing equation. The nonlinear search is bisection with a linear convergent rate. The number of iterations depends on the accuracy requirement, and details are discussed above in Section II-A. A numerical example is also included in Section II-A to illustrate how the spectrum-slicing equation can be used to locate the eigenvalues to any desired accuracy. The calculation of the updated eigenvectors depends upon the accurate calculation of the eigenvalues. A possible drawback of the recursive procedures is the potential error accumulation from one update to the next. Thus the eigenpairs should be as accurate as possible to avoid excessive degradation of the next decomposition, which can be accomplished either from pairwise Gram-Schmidt or from full-scale Gram-Schmidt orthogonalization procedures on the derived eigenvectors. Experimental results indicate that the pairwise Gram-Schmidt partial orthogonalization at each update seems to control the error buildup in the recursive rank-1 updating. Another approach is to refresh the procedure from time to time to avoid any possible roundoff error buildup.

III. Adaptive EVD for Frequency or Direction of Arrival Estimation and Tracking

This section applies the modified EVD algorithms to the eigenbased techniques for frequency or angle of arrival estimation and tracking. Specifically, the adaptive versions of the principal eigenvector (PE) method of Tufts and Kumersan, the total least squares (TLS) method of Rahman and Yu, and the MUSIC algorithm are applied.

(A) Adaptive PE Method

In the linear prediction (LP) method for frequency estimation, the following LP equation is set up:

$$\begin{bmatrix} x(0) & \cdots & x(L-1) \\ \vdots & & \vdots \\ x(N-L-1) & & x(N-2) \end{bmatrix} \begin{bmatrix} c(L) \\ \vdots \\ c(1) \end{bmatrix} = \begin{bmatrix} x(L) \\ \vdots \\ x(N-1) \end{bmatrix} \quad (46)$$

or $$X^H c = x \quad (47)$$

where $L$ is the prediction order chosen to be $M \leq L \leq N-1$, $M$ is the number of sinusoids, and $X^H$ is the data matrix. Note that in the case of array processing for angle of arrival estimation, each row of the data matrix is a snapshot of sensor measurement. Premultiplying both sides of equation (47) by $X$ gives the following covariance matrix normal equation:

$$Rc = r \quad (48)$$

where $R = XX^H$ and $r = Xx$. The frequency estimates can be derived from the linear prediction vector coefficient $c$. In a non-stationary environment, it is desirable to update the frequency estimates by modifying the LP system continuously as more and more data are available. Specifically, the LP system is modified by deleting the first $k$ rows and appending another $k$ rows (corresponding to a rank-2k update) as follows:

$$\begin{bmatrix} x(k) & \cdots & x(L+k-1) \\ \vdots & & \vdots \\ x(N+k-L-1) & \cdots & x(N+k-2) \end{bmatrix} \begin{bmatrix} c(L) \\ \vdots \\ c(1) \end{bmatrix} = \begin{bmatrix} x(L+k) \\ \vdots \\ x(N+k-1) \end{bmatrix} \quad (49)$$

which leads to the following modification of the covariance matrix normal equation:

$$\hat{R}\hat{c} = \hat{r} \quad (50)$$

where $$\hat{R} = R + \sum_{i=1}^{k} \alpha_i \alpha_i^H - \sum_{i=1}^{k} \beta_i \beta_i^H \text{ and} \quad (51)$$

$$\hat{r} = r + \sum_{i=1}^{k} \alpha_i x(N+i-1) - \sum_{i=1}^{k} \beta_i x(L+i-1) \quad (52)$$

where $\alpha_i = [x(N+i-L-1) \ldots x(N+i-2)]^H$ and $\beta_i = [x(i-1) \ldots x(L+i-2)]^H$. The PE solution for $\hat{c}$ is obtained using the following pseudo-rank approximation (assuming that there are M sources):

$$\hat{c} = \sum_{i=1}^{M} \frac{\hat{q}_i^H \hat{r}}{\hat{\lambda}_i} \hat{q}_i \quad (53)$$

where $\hat{\lambda}_i$ and $\hat{q}_i$ are the eigenpair solutions at each time instance. The frequencies can then be obtained by first solving the zeros of the characteristic polynomials formed by $\hat{c}$. M of the zeros closest to the unit circle are then used for determining the sinusoidal frequency estimates.

Because only M principal eigenvalues and eigenvectors are used in equation (53) for solving the LP coefficient vector $\hat{c}$, it is desirable to modify the previous algorithm to monitor only the M principal eigenvalues and eigenvectors instead of the complete set of N eigenvalues and eigenvectors to facilitate computational efficiency. In order to implement the update, noise eigenvalues need to be monitored. It is not necessary to monitor the entire set of noise eigenvectors, however. Now assume the principal eigenvalue $\lambda_1 \leq \lambda_2 \leq \ldots \leq \lambda_M$, the noise eigenvalue $\rho^2$ (of multiplicity N-M), and the signal subspace $S = [q_1 \ldots q_M]$ are available. The rank-2k update algorithm requires the knowledge of 2k noise eigenvectors, the noise eigenvalues, and the principal eigenvalues and eigenvectors. The 2k noise eigenvectors can be obtained in the normalized orthogonal projection of $\{\alpha_i\}$ and $\{\beta_i\}$ on noise subspace $N = [q_{M+1} \ldots q_N]$. These constructions lead to $q_j^H \alpha_i = 0$ and $q_j^H \beta_i = 0$ for i=1, ... k and j=M+2k, ... N, and it is not necessary to construct $\{q_j\}_{j=M+2k+1}^N$. (This procedure corresponds to the deflation situation and subspace update with multiplicity as discussed in an earlier section.) $\sigma^2$ remains as the last N−M−2k+1 eigenvalue. The algorithm is summarized as follows:

1. Construct $\{q_{M+i}\}_{i=1}^{2k}$ such that they are orthogonal to $\{q_i\}_{i=M+2k+1}^N$, i.e., $$q_{M+1} = \alpha_j - \sum_{i=1}^{M+j-1}(q_i^H \alpha_j)q_i \quad j = 1, \ldots k$$

$$q_{M+k+j} = \beta_j - \sum_{i=1}^{M+k+j-1}(q_i^H \beta_j)q_i \quad j = 1, \ldots k$$

2. Conduct a nonlinear parallel search for $\{\hat{\lambda}_1, \hat{\lambda}_2, \ldots \hat{\lambda}_{M+2k}\}$ using (21). Conduct a nonlinear parallel search for $\{\hat{\lambda}_1, \hat{\lambda}_2, \ldots \hat{\lambda}_{M+2k}\}$ using (21).
3. Update the noise eigenvalue $\hat{\sigma}^2$ $$\hat{\sigma}^2 = \frac{\hat{\lambda}_{M+1} + \ldots + \hat{\lambda}_{M+2k} + (N-M-2k)\sigma^2}{(N-M)}$$

4. Update the signal subspace eigenvector using (24).

(B) Adaptive Total Least Squares Method

The TLS method is a refined and improved method for solving a linear system of equations when both the data matrix, $X^H$, and the observed vector, x, are contaminated by noise. In the LP method for frequency estimation, both sides of the equation are contaminated by noise. Thus it is desirable to apply the TLS method to solve the LP equation. The relative factor for weighting the noise contribution for both sides of the equation is equal to 1, because $X^H$ and x are derived from the same noisy samples $\{x(i)\}$. This leads to the following homogeneous system of equations:

$$\begin{bmatrix} x(0) & \ldots & x(L) \\ \vdots & & \vdots \\ x(N-L-1) & & x(N-1) \end{bmatrix} \begin{bmatrix} c \\ -1 \end{bmatrix} = 0 \quad (54)$$

or in terms of the covariance matrix $$R\begin{bmatrix} c \\ -1 \end{bmatrix} = 0 \quad (55)$$

where $R=XX^H$ and $X^H$ is the data matrix for (54). In a time-varying environment, we delete k rows and append k rows to the data matrix $X^H$ in (54) as done in the adaptive PE method discussed above, leading to the following rank-2k modification of equation (55):

$$\hat{R}\begin{bmatrix} c \\ -1 \end{bmatrix} = 0 \quad (56)$$

where $$\hat{R} = R + \sum_{i=1}^k \alpha_i \alpha_i^H - \sum_{i=1}^k \beta_i \beta_i^H$$

and $\{\alpha_i\}, \{\beta_i\}$ are the appended and deleted rows, respectively. The TLS solution is obtained as the null vector solution of $\hat{R}$. In general, for M sinusoids or M target sources, there are N−M number of minimum eigenvalues and eigenvectors. Any vector in the noise subspace is a solution. Out of these infinite number of solutions, one can choose the following minimum norm solution:

$$\hat{c} = -\sum_{k=M+1}^N \frac{[\hat{q}_k^*]_{L+1}}{\sum_{k=M+1}^N [\hat{q}_k^*]_{L+1}} \hat{q}_k' \text{ where } \hat{q}_k = \begin{bmatrix} \hat{q}_k' \\ [\hat{q}_k]_{L+1} \end{bmatrix} \quad (57)$$

Thus, in the TLS solution, it is the noise subspace $N=[q_{M+1} \ldots q_N]$ that must be monitored. Because the signal eigenvalues and eigenvectors are also used for updating the noise eigensystem, reduction in computational complexity, as done in the adaptive PE method, is not achieved.

(C) Adaptive MUSIC

In this subsection, the recursive version of a class of high-resolution algorithms is considered for multiple target angle estimation or frequency estimation based on the eigenvalue decomposition of the ensemble-averaged covariance matrix of the received signal. Consider a system of K moving targets to be tracked by an array of M sensors. The sensors are linearly distributed with each sensor separated by a distance d from the adjacent sensor. For a narrowband signal, the model of the output of the m-th sensor becomes $$r_m(t) = \sum_{k=1}^K A_k(t)e^{j2\pi T_k(t)\frac{(m-1)d}{\lambda}} + n_m(t) \quad m = 1, 2, \ldots M \quad (58)$$

where $A_k(t)$ is the complex amplitude of the k-th target at time t, $T_k(t)=\sin\{\theta_k(t)\}$ where $\theta_k(t)$ is the angle of arrival of the k-th target at time t, and $N_m(t)$ is the m-th sensor noise. Using vector notation, equation (58) can be written as $$r(t)=A(t)s(t)+N(t) \quad (59)$$

where

[0230]

$$r(t) = \begin{bmatrix} r_1(t) \\ r_2(t) \\ \vdots \\ r_{M(t)} \end{bmatrix} \quad s(t) = \begin{bmatrix} s_1(t) \\ s_2(t) \\ \vdots \\ s_{K(t)} \end{bmatrix} \quad n(t) = \begin{bmatrix} n_1(t) \\ n_2(t) \\ \vdots \\ n_{M(t)} \end{bmatrix}$$

and the M×K direction of arrival (DOA) matrix A(t) is defined as

[0232]

$$A(t) = \begin{bmatrix} 1 & 1 & \ldots & 1 \\ e^{j2\pi\frac{T_1 d}{\lambda}} & e^{j2\pi\frac{T_2 d}{\lambda}} & & e^{j2\pi\frac{T_k d}{\lambda}} \\ \vdots & \vdots & & \vdots \\ e^{j2\pi T_1 \frac{(M-1)d}{\lambda}} & e^{j2\pi T_2 \frac{(M-1)d}{\lambda}} & & e^{j2\pi T_k (M-1)d} \end{bmatrix}$$

The output covariance matrix can then be expressed as follows:

$$R(t)=A(t)S(t)A^H(t)+\sigma^2(t)I \quad (60)$$

where $S(t)=E[s(t)s^H(t)]$ is the signal covariance matrix, and $\sigma^2(t)$ is the noise power. Assuming that K<M, the MUSIC algorithm applied at time t yields an estimate of the number of targets K, their DOA $\{\theta_k(t)\}$, the signal covariance matrix S(t), and the noise power $\sigma^2(t)$, by examining the eigenstructure of the output covariance matrix R(t). R(t) can be estimated from an ensemble of outer products of snapshots in a sliding window or in an exponential forgetting window as discussed in Section 1.

The MUSIC algorithm and its root-finding variations are briefly reviewed here. Suppose at time t, the estimated covariance matrix has the following EVD:

[0237]

$$R = \sum_{i=1}^{N} \lambda_i q_i q_i^H \qquad (61)$$

$$= \sum_{i=1}^{K} \lambda_i q_i q_i^H + \sigma^2 \sum_{i=K+1}^{N} q_i q_i^H$$

The algorithm depends on the fact that that the noise subspace $E_N=[q_{K+1} \ldots q_M]$ is orthogonal to the signal manifold; i.e., $$E_N^H u(\theta)=0 \qquad (62)$$

where $u(\theta)$ is the steering vector of the angles to be searched. The conventional MUSIC algorithm involves searching for the peaks of the following eigenspectrum:

[0241]

$$J(\theta) = \frac{u^H(\theta)u(\theta)}{u^H(\theta)E_N E_N^H u(\theta)} \qquad (63)$$

To do this, the complete angular interval $$\frac{-\pi}{2} \le \theta \le \frac{\pi}{2}$$

is scanned. One can avoid the need for this one-dimensional scanning by the use of a root-finding approach. This can be accomplished by, for example, using a known root-MUSIC or minimum norm algorithm.

In the root-MUSIC algorithm, $$e^{j2\pi \frac{T_k d}{\lambda}}$$

is replaced by the complex variable z in the eigenspectrum $J(\theta)$ defined in (63). Let D(z) denote the resulting denominator polynomial. The polynomial D(z) can be expressed as the product of two polynomials, H(z) and $H(z^{-1})$, each with real coefficients. The first polynomial, H(z), has its zero inside or on the unit circle; K of them will be on (or very close to) the unit circle and represent the signal zero. The remaining ones represent extraneous zeros. The zeros of the other polynomial, $H(z^{-1})$, lie on or outside the unit circle, exhibiting inverse symmetry with respect to the zero of H(z). The angle estimation is thus performed by extracting the zeros of the polynomial D(z) and identifying the signal zeros from the knowledge that they should lie on the unit circle.

The minimum norm algorithm is derived by linearly combining the noise eigenvectors such that:

1. The first element of the resulting noise eigenvector is unity.
2. The resulting noise eigenvector lies in the noise subspace.
3. The resulting vector norm is minimum.

Equation (62) is then modified to

[0249]

$$A(\theta) = \frac{\delta_1^H E_N E_N^H u(\theta)}{\delta_1^H E_N E_N^H \delta_1} = 0 \qquad (64)$$

where $\delta=_1{}^H=[1 0 \ldots 0]$. The angle estimation problem is then solved by computing the zeros of the resulting polynomial of equation (64) and identifying the signal zeros as the K zeros of A(z) that lie on (or very close to) the unit circle.

(IV.) Simulation Results ($\lambda$.) Numerical Properties

In this section, the numerical performance of the discussed algorithms are considered as demonstrated by simulation. The simulations are performed with a time-varying signal in additive white noise. Consider the measurement model (Equation 58) for a scenario where there are three sources (K=3) impinging on a linear array of 10 sensors (M=10). The signal-to-noise ratio for each source is 20 dB. The angles are given by $\theta_1(t)=5°, \theta_2(t)=22°$ and $\theta_3(t)=12°$.

$$(K-1)\frac{2}{299}.$$

In each experiment, 100 updates are carried out. Each EVD update is obtained by updating the covariance matrix derived from the data snapshots within a window of length 41.

As recursive procedures may suffer potential error accumulation from one update to the next, therefore the sensitivity of the exemplary algorithm was investigated as a function of the order of the matrix, and the accuracy requirements for the eigenvalues searched. Stability and sensitivity tests have been conducted for this algorithm and comparisons of the performance of the recursive algorithms with conventional measures.

The angle estimates for various sizes of matrices (M=7, 10) and eigenvalue search accuracy requirements (tol E-10, E-5) were compared with the estimates obtained from a conventional routine. It was observed that the performance is merely a function of the size of the matrix used, and is not dependent on whether a conventional eigenvalue decomposition routine or the present recursive procedure for the eigenvalue decomposition is used, nor on the accuracy requirements on the eigenvalue search. In fact the results are practically the same for each case.

Although an exemplary fast recursive eigenvalue decomposition technique is described above, other fast recursive eigenvalue decomposition updating techniques may be used. Preferably, the technique used is capable of updating the eigenvalue decomposition within a single pulse period (between the beginning of a pulse and the beginning of the next successive pulse).

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for estimating a number of targets within a main beam of an antenna array that transmits the main beam and receives echo returns from the main beam, comprising the steps of:

(a) generating a covariance matrix using the echo returns;

(b) detecting the presence of at least one target within a single range cell;

(c) transmitting a plurality of consecutive pulses in a direction of the single range cell within a sufficiently short period that the at least one target remains within the single range cell while the plurality of consecutive pulses are transmitted;

(d) sampling an echo signal from ones of the plurality of consecutive pulses;

(e) estimating an updated covariance matrix each time one of the echo signals is sampled in step (d);

(f) updating an eigenvalue decomposition each time the covariance matrix is updated;

(g) estimating the number of targets in the single range cell based on the updated eigenvalue decomposition.

2. The method of claim 1, wherein steps (c) through (f) are performed until a convergence criterion is satisfied.

3. The method of claim 2, wherein the convergence criterion is satisfied if the estimated number of targets remains unchanged after step (g) is performed a predetermined number of consecutive times.

4. The method of claim 1, wherein step (e) includes applying an exponential forgetting window to the covariance matrix.

5. The method of claim 1, wherein step (e) includes using a sliding window to update the covariance matrix.

6. The method of claim 1, wherein the eigenvalue decomposition is performed using a parallel spectrum-slicing algorithm.

7. The method of claim 6, wherein a plurality of eigenvectors are computed as a solution of a homogeneous Hermitian system.

8. The method of claim 1, wherein the number of targets is determined by the number of significant eigenvalues determined by the eigenvalue decomposition of step (f).

9. The method of claim 1, further comprising performing at least one of the group consisting of a surveillance function and a tracking function before step (c).

10. The method of claim 9, further comprising performing the at least one of the group consisting of a surveillance function and a tracking function after step (g).

11. The method of claim 10, wherein the at least one of the group consisting of a surveillance function and a tracking function is discontinued while steps (c) through (g) are being performed.

12. Apparatus for estimating a number of targets within a main beam of a radar system having an antenna that provides antenna array signals, comprising:

means for generating a covariance matrix using the antenna array signals;

means for detecting the presence of at least one target within a single range cell;

means for causing the antenna to transmit a plurality of consecutive pulses in a direction of the single range cell within a sufficiently short period that the at least one target remains within the single range cell while the plurality of consecutive pulses are transmitted;

means for sampling an echo signal from ones of the plurality of consecutive pulses;

means for estimating an updated covariance matrix each time one of the echo signals corresponding to one of the consecutive pulses is sampled;

means for updating an eigenvalue decomposition each time the covariance matrix is updated; and means for estimating the number of targets in the single range cell based on the eigenvalue decomposition.

13. The apparatus of claim 12, wherein the eigenvalue decomposition updating means updates the eigenvalue decomposition until a convergence criterion is satisfied.

14. The apparatus of claim 13, wherein the convergence criterion is satisfied if the estimated number of targets remains unchanged after the number generating means estimates the number of targets a predetermined number of consecutive times.

15. The apparatus of claim 12, wherein the covariance matrix estimating means applies an exponential forgetting window to the covariance matrix.

16. The apparatus of claim 12, wherein the covariance matrix estimating means uses a sliding window to update the covariance matrix.

17. The apparatus of claim 12, wherein the eigenvalue decomposition updating means uses a parallel spectrum-slicing algorithm.

18. The apparatus of claim 17, wherein the eigenvalue decomposition updating means computes a plurality of eigenvalues as a solution of a homogeneous Hermitian system.

19. The apparatus of claim 12, wherein the number estimating means estimates the number of targets based on the number of significant eigenvalues determined by the eigenvalue decomposition updating means.

20. The apparatus of claim 12, the radar system is capable of performing at least one of the group consisting of a surveillance function and a tracking function.

* * * * *